(12) United States Patent
Zhang et al.

(10) Patent No.: US 9,072,112 B2
(45) Date of Patent: Jun. 30, 2015

(54) MEDIUM ACCESS CONTROL FOR WIRELESS NETWORKS

(71) Applicant: Samsung Electronics Co., Ltd., Suwon-si (KR)

(72) Inventors: Yuanyuan Zhang, Middlesex (GB); Mahmoud Hadef, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 13/790,571

(22) Filed: Mar. 8, 2013

(65) Prior Publication Data
US 2013/0235745 A1    Sep. 12, 2013

(30) Foreign Application Priority Data

Mar. 9, 2012 (GB) ................................... 1204223.3
Aug. 6, 2012 (KR) ......................... 10-2012-0087169

(51) Int. Cl.
*H04L 12/26* (2006.01)
*H04W 72/08* (2009.01)
*H04W 28/18* (2009.01)
*H04W 24/10* (2009.01)
*H04W 74/08* (2009.01)

(52) U.S. Cl.
CPC ............. *H04W 72/085* (2013.01); *H04W 72/08* (2013.01); *H04W 24/10* (2013.01); *H04W 28/18* (2013.01); *H04W 74/08* (2013.01)

(58) Field of Classification Search
CPC ............................. H04W 72/085; H04W 72/08
USPC ........................................................ 370/252
See application file for complete search history.

(56) References Cited

U.S. PATENT DOCUMENTS

2011/0122933 A1*    5/2011    Adam et al. ................. 375/219

* cited by examiner

*Primary Examiner* — Sai-Ming Chan
(74) *Attorney, Agent, or Firm* — NSIP Law

(57) ABSTRACT

A wireless network includes a source node, a destination node, and at least a first relay node. The network is arranged to determine a first measure of signal quality for a direct link between the source node and the destination node, and a second measure of signal quality for a link between the source node and the destination node via at least one relay node. At a relay node, the duration of a recruitment slot is determined, within which the relay node may transmit a recruitment message indicating availability of the relay node to relay. The recruitment slot duration is determined on the basis of the first measure of signal quality. In this way, the recruitment of a relay may depend on the signal quality of the direct link from the source node to the destination node.

26 Claims, 13 Drawing Sheets

CTS

| Frame Control | Duration & Recruitment | Destination Address | Source Address | CRC |
|---|---|---|---|---|
| 2 | 3 | 6 | 6 | 4 |

Octets

RTR

| Frame Control | Duration & Rates | Destination Address | Source Address | CRC |
|---|---|---|---|---|
| 2 | 4 | 6 | 6 | 4 |

Octets

Figure 9

MEDIUM ACCESS CONTROL FOR WIRELESS NETWORKS

CROSS-REFERENCE TO RELATED APPLICATION

This application claims the benefit of United Kingdom Application No. 1204223.3 filed on Mar. 9, 2012, in the United Kingdom Intellectual Property Office, and Korea Patent Application No. 10-2012-0087169, filed on Aug. 9, 2012, in the Korea Intellectual Property Office, the disclosures of which are both incorporated herein by reference in there entireties for all purposes.

BACKGROUND

1. Field

The following embodiments of relate to a Medium Access Control for Wireless Networks.

2. Description of the Related Art

Wireless networks, such as a Wireless Local Area Network (WLAN) according to the IEEE 802.11 standard, are widely deployed, and typically provide the benefits of low cost, simple deployment, and high speed data communications. In a WLAN, the physical layer of IEEE 802.11a/b/g/n standards is typically used to transmit and receive data packets over a shared wireless medium. The IEEE 802.11 standard's Medium Access Control (MAC) typically provides a reliable delivery mechanism for user data over wireless channels which may be subject to interference and fading. IEEE 802.11 standard's DCF (Distributed Coordination Function) is a typical MAC protocol based on Carrier Sense Multiple Access with Collision Avoidance (CSMA/CA), in which a handshaking mechanism is typically used to combat the effects of collisions and facilitate transmission of large data packets. In such a DCF scheme, when a source node is ready to transmit a packet, the source node first monitors the activity on the transmission channel until an idle period equal to a DIFS (Distributed Inter Frame Space) is detected. In this instance, the source node waits for another random backoff interval before transmitting to avoid a collision with other nodes. The source node starts the transmission by sending a RTS (Request-To-Send) control packet. If the control packet is received correctly, the destination node sends a CTS (Clear-to-Send) control packet after a SIFS (Short Inter Frame Space) interval. Once the CTS packet is received, the source node transmits its data packet after an SIFS interval. If the data packet is received correctly, the destination node responds by sending an acknowledgement (ACK) packet after the SIFS interval. IEEE 802.11 DCF also makes use of a network allocation vector (NAV) for virtual carrier sensing. The NAV is typically maintained by nodes that are not currently involved in any transmission or reception of packets, and tracks the remaining time of any ongoing data transmission and updates according to information received in the control/data packets.

With the expanding use of wireless mesh networks employing ad-hoc routeing between nodes via other nodes which are used as relay nodes, MAC schemes such as IEEE 802.11 DCF have been extended to so called cooperative MAC schemes that allow cooperation between nodes at the MAC layer to enable routeing via beneficial multi-hop routes, so that, for example, a slow single hop transmission may be replaced by a fast two or more hop transmission. MAC protocols for cooperative communications include CoopMAC (Cooperative MAC), rDCF (relay enabled DCF), and Robust Cooperative Relaying.

However, conventional cooperative MAC protocols can be inefficient in terms of complexity, signalling overhead, and data capacity. For example, a database of the signal qualities of links between nodes may have to be maintained, with associated signalling, in order to select an appropriate multi-hop route. Furthermore, conventional cooperative MAC protocols can be restricted in their capabilities by a need to limit interference between simultaneous transmissions of data. As a result, selection of routes can be mutually exclusive due to potential interference and thus limit achievable bandwidth.

Therefore, mitigation of these and other problems with such systems is needed.

SUMMARY

In one general aspect, a method of transmitting signals in a wireless network, the wireless network comprising a source node, a destination node, and at least a first relay node, the method comprising: obtaining a first measure of signal quality of a direct link between the source node and the destination node, obtaining a second measure of signal quality of a link between the source node and the destination node via at least the first relay node, and determining a duration of a recruitment slot based on the first measure of signal quality within which the relay node may transmit a recruitment message indicating availability of the relay node to relay.

One advantage provided by this is that the recruitment of a relay may be dependent on the signal quality of the direct link from the source node to the destination node, and a relay may be less likely to be recruited if the signal quality of the direct link is good than if it is poor.

The method may further comprise determining a delay period for transmission of the recruitment message from the first relay node based on the second measure of signal quality; and transmitting the recruitment message after the determined delay.

The method also may comprise: selecting from among at least transmitting data from the source node to the destination node in a first mode comprising transmission directly from the source node to the destination node and a second mode comprising transmission from the source node to the destination mode by a first path via one relay. In addition, the method may comprise: selecting to transmit data according to the second mode of operation on a basis comprising the first and second measures of signal quality.

One advantage provided by this is that data may be transmitted in a mode appropriate for transmission from the source node to the destination mode by a first path via one relay by comparison of a measure of signal quality of the direct link with a measure of quality of the link from the source to the destination via the one relay, in a format appropriate for the second mode with, for example, appropriate addressing.

The method may further comprise: sending a first message from the source node indicating that data is ready to send; receiving the first message at the destination node; and determining the first measure of signal quality from the signal quality of the first message as received at the destination node.

One advantage provided by this is that the first measure of signal quality may be determined on the basis of the receipt of existing signalling without the need to provide additional signalling.

The method may further comprise: receiving the first message at the first relay node; and determining the second measure of signal quality from at least the signal quality of the first message as received at the first relay node.

One advantage provided by this is that the second measure of signal quality may be determined on the basis of the receipt of existing signalling without the need to provide additional signalling.

In addition, the method also may further comprise: determining a duration of a recruitment slot within which a relay node may transmit a message on the basis of the signal quality of the received first message; and sending a second message from the destination mode comprising an indication of the duration of the recruitment slot within which a relay node may transmit a message.

One advantage provided by this is that the duration of a recruitment slot may be conveyed to other nodes of the network efficiently, using the second message, which may be a modification of a message that needs to be sent for another purpose, such as to indicate Clear to Send (CTS).

The method may further comprise: receiving the second message at the first relay node, wherein determining the second measure of signal quality includes determining the second measure of signal quality on the basis of at least the signal quality of the second message as received at the first relay node.

One advantage provided by this is that the second measure of signal quality may be determined on the basis of the receipt of existing signalling.

The method may further comprise: determining a delay period starting from the end of receipt of the second message at the first relay node; and transmitting a third message comprising a recruitment message from the first relay node after the determined delay period when the determined delay period is less than or equal to the duration of the recruitment slot.

One advantage provided by this is that the recruitment message may not be sent if the delay period is longer than the recruitment slot, so that the recruitment of relays may be inhibited on the basis of the signal quality in the direct link from the source node to the destination node.

Transmitting a third message may include transmitting the third message including an indication of the second measure of signal quality.

One advantage provided by this is that the second measure of signal quality may be conveyed to the source node using the recruitment message thereby providing efficient use of signalling resources.

The method may further comprise: transmitting from the source node to the destination node by a first path via one relay based on receipt of the third message. In addition, the method also may comprise: determining a data rate for transmission of data from the source node on a basis comprising the indication of the second measure of signal quality in the third message.

One advantage provided by this is that the data rate may be determined appropriately for the link from the source node to the destination node via the relay node.

The method may further comprise: determining a modulation scheme for transmission of data from the source node on a basis of the indication of the second measure of signal quality in the third message.

Selecting from among at least a first mode and a second mode further includes selecting among the first mode, the second mode, and a third mode may comprise transmission from the source node to the destination mode via a combination of the first path via the first relay node and a second path via a further relay node. In addition, the method may further comprise: receiving, at the further relay node, a first message from the source node indicating that data is ready to send; determining a third measure of signal quality of the first message as received at the further relay node; receiving, at the further relay node, a second message from the destination mode comprising an indication of the duration of the recruitment slot within which a relay node may transmit a message; receiving a third message including a recruitment message from the first relay node; determining a fourth measure of signal quality as a measure of signal quality of the second message as received at the further relay node; determining a delay period for transmission of a fourth message based on the third and fourth measures of signal quality starting from the end of receipt of the third message at the further relay node; and transmitting the fourth message after the determined delay period when the determined delay period is less than or equal to the duration of the recruitment slot.

One advantage provided by this is that the data capacity of the wireless network may be increased by simultaneous transmission of data via at least two relays.

The fourth message may include an indication of received signal quality based on the third and fourth measures of signal quality.

One advantage provided by this is that signalling may be conveyed efficiently without requiring additional messages to be sent.

The method may further include selecting the third mode of operation for transmission of data from the source node on a basis of the receipt of the third and fourth messages; and determining a data rate for transmission of data from the source node on a basis of the indication in the third message and the fourth message of received signal quality based on the first measure, the second measure, the third measure, and the fourth measure of signal quality.

One advantage provided by this is that the source node may set a data rate appropriate to the link over which the data may be sent.

The method may further comprise transmitting data simultaneously via the first and second paths.

One advantage provided by this is that the data capacity of the wireless network may be increased.

The method may further comprise relaying data at the first relay node and the further relay node according to a Quantise Map and Forward protocol.

One advantage provided by this is efficient transmission in combination with medium access control.

Sending the first message may include sending a Ready To Send message; sending the second message may include sending a Clear To Send message; transmitting the third message may include transmitting a Ready To Relay message, and transmitting the fourth message may include transmitting a Ready To Relay message.

Determining a duration of a recruitment slot based on the first measure of signal quality within which the relay node may transmit a recruitment message indicating availability of the relay node to relay may further include determining the duration on the basis of an allowed modulation or coding scheme.

One advantage provided by this is that the recruitment slot duration may be set according to an achievable data rate taking into account an allowed modulation or coding scheme.

The method may further comprise receiving an indication of said allowed modulation or coding scheme from the source node.

One advantage provided by this is that the source node may communicate the allowed modulation scheme to other nodes.

The wireless network may operate according to IEEE 802.11 standard.

In accordance with another general aspect, a relay node for transmitting signals in a wireless network, the wireless network comprising a source node, a destination node and at least the relay node, the wireless network being arranged to determine a first measure of signal quality relating to a direct link between the source node and the destination node, and a second measure of signal quality relating to a link between the source node and the destination node via at least the first relay node, the relay node configured to determine a duration of a recruitment slot based on the first measure of signal quality within which the relay node may transmit a recruitment message indicating availability of the relay node to relay.

The relay node may be further configured to transmit a recruitment message and determine a delay period for transmission of the recruitment message from the first relay node based on the second measure of signal quality.

Further features and advantages of the invention will be apparent from the following description of preferred embodiments of the invention, which are given by way of example only.

BRIEF DESCRIPTION OF THE DRAWINGS

FIG. 9 is a schematic diagram showing an example of RTS and CTS signalling fields;

DETAILED DESCRIPTION

By way of example, the following is described in the context of an example of a WLAN System operating according to IEEE 802.11 protocols. However, it will be understood that this description is by way of example only and that the description may be used with other wireless systems; and these examples are not limited to the use of WLAN Systems.

Figure 1:
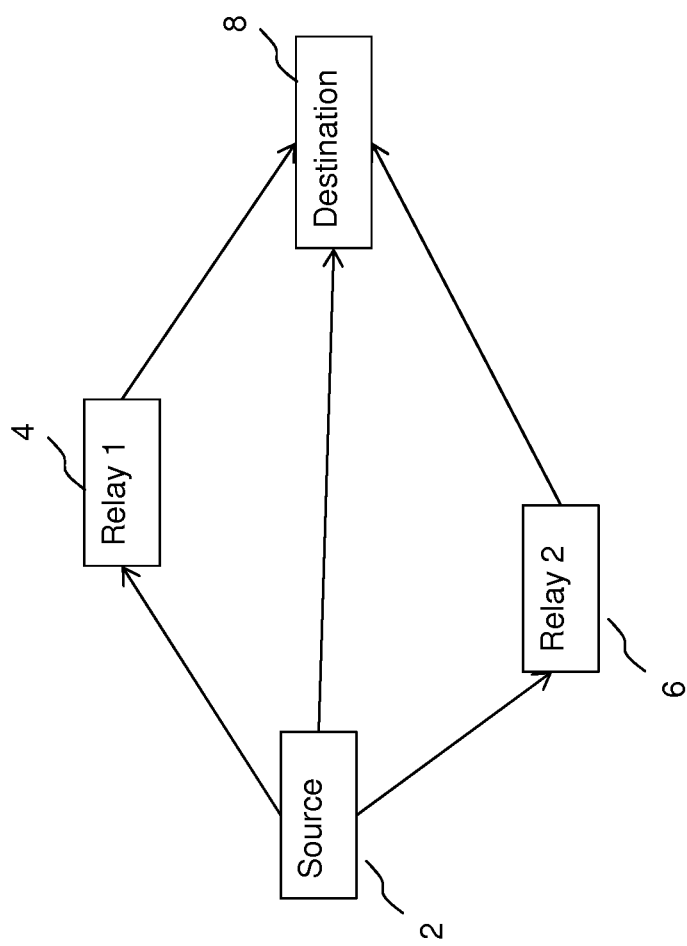
FIG. 1 is a schematic diagram showing an example of a network with two relay nodes.

FIG. 1 shows an example in which a wireless network, in this example a WLAN, operating according to the IEEE 802.11 standards, which comprises a source node 2, a first relay node 4, and a second relay node 6, and a destination node 8. Data, for example, in the form of data frames, is sent from the source node to the destination node. As shown in FIG. 1, the data may be sent directly from the source node 2 to the destination node 8, and/or the data may be sent via one or both relay nodes 4, 6. The network routes the data depending factors, such as: 1) the signal quality of the links via each relay, and 2) the signal quality in the direct link from the source node 2 to the destination node 8. The link or combination of links via which the data is sent may be determined on a frame by frame basis, as the nodes move or as the radio frequency environment changes, for example, by a change in interference or fading characteristics. Relay nodes are either recruited or not recruited to be used in a link from the source node 2 to the destination node 8, typically on the frame-by-frame basis. Recruitment of relay nodes may be arranged as illustrated in FIG. 2.

Figure 2:
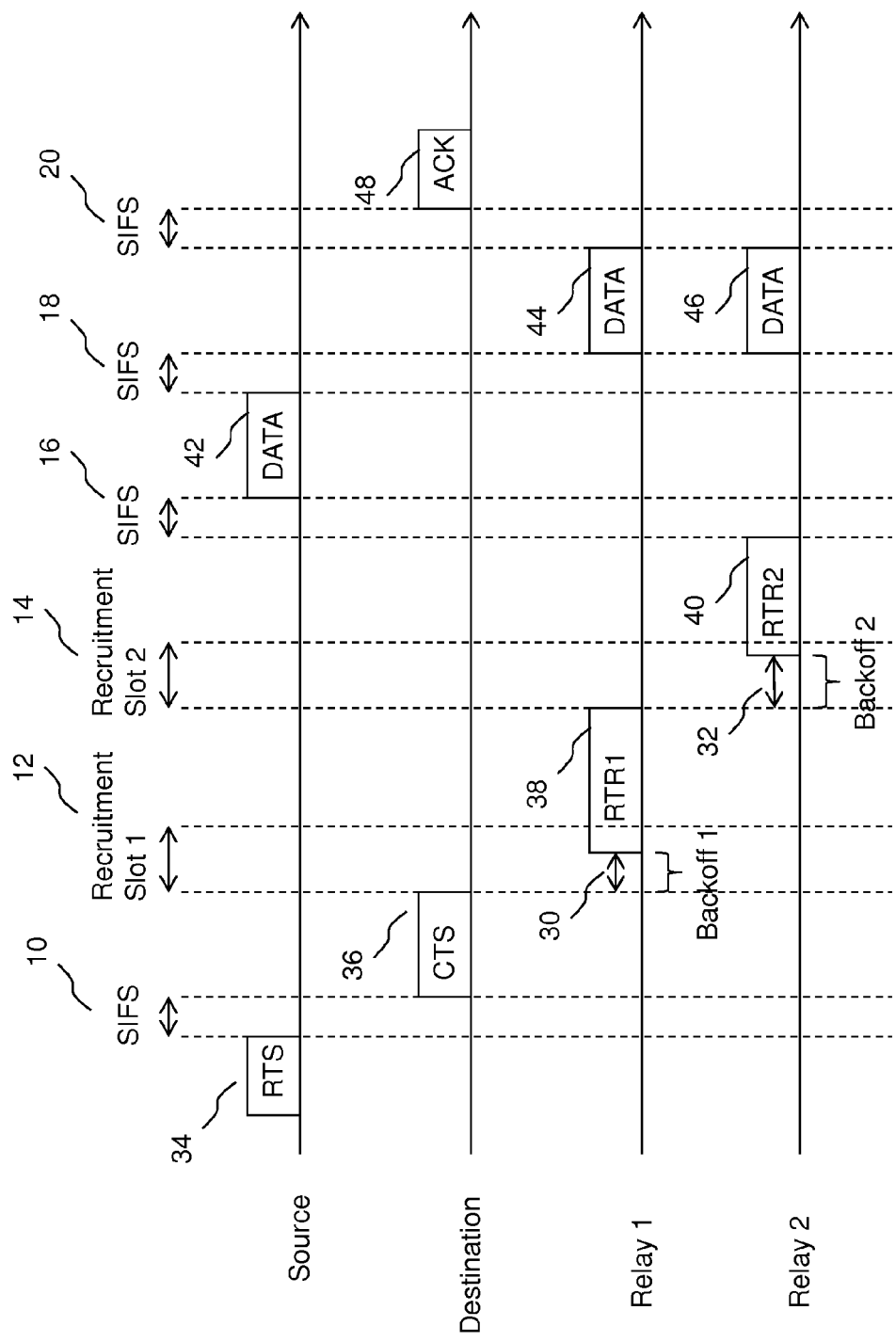
FIG. 2 is a timing diagram showing an example of message flow in a scenario in which two relays are recruited.

FIG. 2 is an example of a timing diagram showing message flow between the source node 2, the destination node 8, and two relay nodes 4, 6. In the example shown if FIG. 2, two relay nodes 4, 6 are recruited, for example, to send of one or more data frames. The wireless network is arranged to determine a first measure of signal quality relating to a direct link between the source node 2 and the destination node 8, and a second measure of signal quality relating to a link between the source node 2 and the destination node 8 via at least the first relay node 4. The first measure of signal quality may be determined from the signal quality of a message that is received at the destination node from the source node, for example, from a first message sent from the source node 2 indicating that data is ready to be sent, such as an RTS message 34. The first message also may be received at the first relay node, and the second measure of signal quality may be determined from at least the signal quality of the first message that is received at the first relay node.

FIG. 2 shows two recruitment slots, recruitment slot 12 and recruitment slot 14, within the illustrated frame format. A recruitment slot is a period within which a relay node may transmit a recruitment message indicating availability of the relay node to relay, such as a RTR signal (e.g., RTR1 38, RTR2 40). The relay node may be sent data from the source node to relay to the destination node on the basis of the receipt of the recruitment message at the source node.

The duration of a recruitment slot is determined, for example, on the basis of the quality of the direct link from the source node to the destination node (i.e., the first measure of signal quality). Typically, the higher the quality of the direct link is the shorter the period of the recruitment slot is.

Each relay node backs off or delays transmission of the recruitment message by a back-off or delay period, according to the quality of the link from the source node to the destination node via the relay node (i.e., the second measure of signal quality). As a result, the relay node that is determined to have the best link transmits its recruitment message first. Upon receiving the recruitment message, the other relays inhibit transmission of their own recruitment message in that recruitment slot; however, the other relays may be able to attempt transmission of their recruitment message in a second recruitment slot, in which the already-recruited relay will be silent.

In this way, the relay node having the highest quality link is recruited first, and a relay node is typically only recruited if the direct link is sufficiently poor in comparison with a link via a relay that it is advantageous to use the relay.

If a direct link is poor, the recruitment slot is longer, so that even relays that transmit a recruitment message after a long period have a chance to be recruited. However, if the direct link is good, the recruitment slot is shorter, so that only relays that transmit a recruitment message after a short period have a chance to be recruited. As a result, relays with poor links are prevented from being recruited and signalling time overhead is reduced. In addition, the duration of the recruitment slot may be zero when the quality of the direct link is sufficiently good. In this case, no relay nodes are recruited even if the signal quality of the link to the relay node is good, because any link via a relay node would comprise two or more hops rather than the single hop from the source node to the destination node and thus offer a less efficient use of radio resources than the direct link.

Data may be transmitted from the source node to the destination node in at least a first mode or a second mode of operation. The first mode comprises transmission directly from the source node to the destination node, and the second mode comprises transmission from the source node to the destination node by a first path via one relay. For example, the destination address of the data may be indicated in a header appropriate to the mode (i.e., the route between the source node and destination node). The second mode of operation may be selected, instead of the first mode on a basis comprising the first and second measures of signal quality. So, the mode of operation in which data is relayed is selected on the basis of the measures of quality of the direct link and the link via the relay.

An indication of the duration of the recruitment slot may be sent in a second message from the destination mode, such as a CTS message 36. The duration of the recruitment slot may be determined on the basis of the signal quality of the received first message at the destination node (i.e., the quality of the direct link). Upon receipt of the message carrying the indication at the relay node, the duration of a recruitment slot within which the relay node may transmit a recruitment message is determined from the received indication.

In addition, the receipt of the second message at the relay node, such as receipt of the CTS message, may be put to a further use. The second measure of signal quality, which relates to the link via the relay node, may be determined on the basis of at least the signal quality of the second message when the second message is received at the first relay node.

A third message, such as a recruitment message, may be transmitted from the relay node after a determined delay period on the basis of the determined delay period is less than or equal to the duration of the recruitment slot. The determined delay period measured from the end of receipt of the second message (e.g., a CTS message) at the relay node. If the determined delay period is longer than the duration of recruitment slot, the recruitment message is not transmitted.

The third message, for example, the RTR message, may comprise an indication of the second measure of signal quality relating to the link via the relay node. The second mode of operation may then be selected on a basis of the receipt of the third message, for example, at the source node. In addition, a data rate may be selected for transmission of data from the source node on a basis of the indication of the second measure of signal quality of the third message. A modulation and/or coding scheme also may be selected on the basis of receipt of the third message at the source node.

A physical layer (PHY) transmission scheme, such as space-time coding, that allows simultaneous transmission and reception of different data streams 44, 46 on a shared medium can be used to advantage with a MAC scheme according to an example, such as that illustrated in FIG. 2. This enables data to be relayed by two or more relays at once, so that two or more links between the source and destination nodes may be set up in parallel thereby increasing the potential data capacity and throughput rate. In one example, the transmission scheme comprises relaying data at the first and subsequent relay nodes according to a Quantise Map and Forward (QMF) protocol that allows simultaneous transmission and simultaneous reception of different data streams 44, 46 on a shared medium.

As a result, data may be transmitted from the source node to the destination mode in a third mode via a combination of a first path via a first relay node and a second path via a further relay node. According to the third mode, the first message, in this example the RTS message, is received at the further relay node, and a third measure of signal quality is determined. The third measure of signal quality is a measure of signal quality of the first message when it is received at the further relay node. The second message, in this case the CTS message, also is received at the further relay node, and a fourth measure of signal quality is determined. The fourth measure of signal quality is a measure of signal quality of the second message when it is received at the further relay node. The fourth measure of signal quality relates to the quality of the link via the further relay.

A second delay period is determined for transmission of a fourth message, in this example an RTR2 message 40 on the basis of the third and fourth measures of signal quality.

The third message, in this example RTR1 38, sent from the first relay node is received at the second relay node. The fourth message, in this example RTR2 40, is transmitted after a determined second delay period 32 on the basis of the determined delay period being less than or equal to the duration of the recruitment slot. The second delay period stars at the end of receipt of the third message at the further relay node. The fourth message, in this case RTR2 40, may comprise an indication of received signal quality based on the third and fourth measures of signal quality.

The third mode of operation for transmission of data from the source node may be selected on a basis comprising the receipt of the third and fourth messages, in this case the RTR1 and RTR2 messages 38, 40, and the indications of signal quality that each carries.

A data rate for transmission of data from the source node may be determined on a basis of the indication in the third and fourth messages of the received signal quality. The received signal quality is based on the second, third, and fourth measures of signal quality.

In an example, the basis for determining the recruitment slot duration comprises an allowed modulation and/or coding scheme. In this way, the signal quality, for example, the signal to noise ratio, may be used to select an allowable modulation and/or coding scheme. The slot duration may be determined on the basis of a data rate that may be achieved using the allowable modulation and/or coding scheme. Similarly, the delay in transmission of the recruitment message from a relay node may depend on an allowable modulation and/or coding scheme, such that the delay is based on the data rate that may be achieved using the allowable modulation and/or coding scheme. Basing determination of the recruitment slot duration on an allowed modulation and/or coding scheme increases the efficiency of the operation of the MAC scheme when selecting relays to recruit. An indication of an allowed modulation and/or coding scheme may be received from the source node. The allowed coding scheme may include a network coding scheme, for example, QMF, AF (amplify and Forward), or CF (Compress and Forward).

As shown in FIG. 2, an SIFS interval 10, 16, 18, 20 is typically provided between the RTS 34 and CTS 36, between the RTR2 40 and data 42 transmitted by the source node, between the data 44, 46 transmitted by the relay nodes, and between the data 44, 46 transmitted by the relay nodes, and the acknowledgement ACK 48 from the destination node. The SIFS interval allows data transmission times to avoid clashes between signals.

Figure 3:
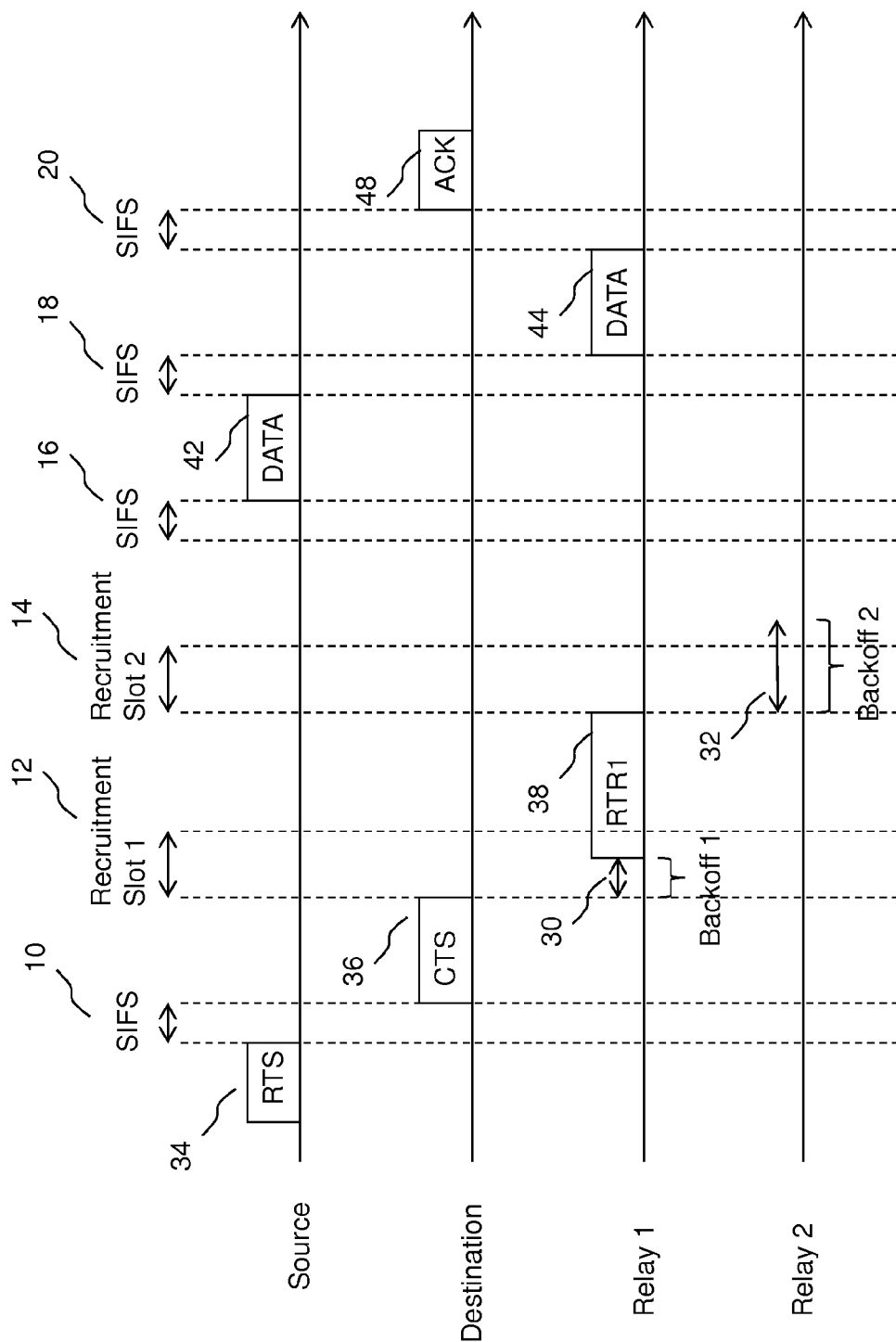
FIG. 3 is a timing diagram showing an example of message flow in a scenario in which one relay is recruited.

FIG. 3 illustrates an example where Relay 2 is experiencing a poor quality link from the source node via Relay 2 to the destination node. As a result, the delay period 32 for the recruitment message is greater than the duration of the recruitment slot 2 14, the RTR2 message is not transmitted, and Relay 2 is not recruited. Hence, the data 42 sent by the source node is not addressed to Relay 2, and is only addressed to Relay 1. Accordingly, data is only relayed by Relay 1 as transmitted data 44.

Figure 4:
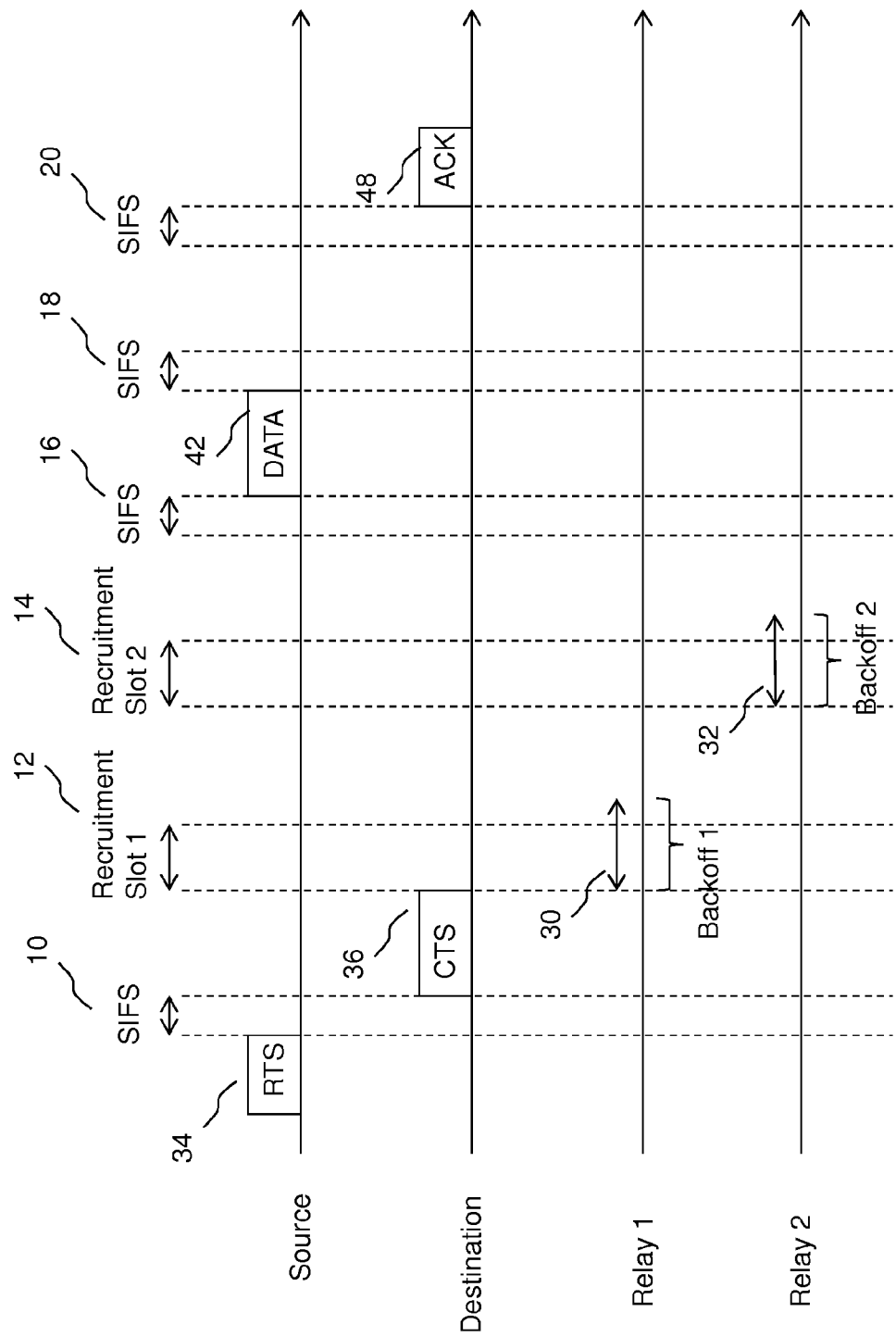
FIG. 4 is a timing diagram showing an example of message flow in a scenario in which no relay is recruited.

FIG. 4 illustrates another example where both Relay 1 and Relay 2 experience poor quality links from the source node via the respective relay to the destination node. As a result, the delay period 30 for the recruitment message is greater than the duration of the recruitment slot 1 12, the RTR1 message is not transmitted, and neither Relay 1 nor Relay 2 is recruited. Hence the data 42 sent by the source node is not addressed to Relay 1 or Relay 2. Accordingly, the data 42 is received via the direct link to the destination node.

According to the descriptions herein, a MAC protocol of a WLAN, such as the IEEE 802.11 standard WLAN, provides cross layer cooperative communications. The MAC protocol, an example of which is illustrated by FIGS. 2, 3, and 4, may be referred to as an Adaptive Cross-layer Cooperative MAC (ACCMAC). The ACCMAC exploits the capabilities of PHY protocols, in particular, the existing QMF protocol, which allows relaying with simultaneous transmission and reception of different data streams on a shared medium. In this way, multiple relay paths may be used in parallel to increase the data capacity of the network. Furthermore, the ACCMAC scheme improves efficiency of signalling overhead through use of existing transmissions, such as RTS and CTS as the basis of link quality measurements. This scheme also enables automatic recruitment of the relays that provide the best quality links without the need to maintain a database of link quality measurements or increased signalling overhead. In addition, relay recruitment is automatic and based on: a recruitment slot that has a duration dependent on the signal quality in a direct link between a source and destination node; a back-off period for a recruitment message from each relay that is dependent on the signal quality; an allowable modulation scheme in a link from the source to the destination via the respective relay.

Furthermore, signal level cooperation at the PHY layer exploits cooperative diversity to improve the outage performance and bit error rate (BER). Packet level cooperation at the MAC layer uses the selection of one or more relays to serve as intermediate nodes to forward data between a source and a destination in a two-hop approach where each hop can provide a higher transmission rate than the direct link between the transmitter and the receiver. In various examples provided herein, a MAC protocol is provided to enable cross-layer cooperative communications between the PHY and MAC layers to provide signal level cooperation at PHY layer and adaptive relay selection at MAC layer. The MAC protocol provides recruitment of relays 'in the air' and avoids the overhead associated with storing a relay table at each node. The MAC layer header is modified to accommodate information exchange among nodes and provide a selection of adaptive transmission modes according to channel conditions from among direct transmission, one-relay, or multiple-relay transmission. Once multiple relays are available, the MAC protocol enables simultaneous transmission from multiple relays instead of sequential transmission from each relay. As has been shown, these aspects of the MAC protocol are integrated into a new Cooperative MAC for WLAN systems, or for other distributed networks, to enable cross layer cooperative communications and potentially provide higher transmission rates and reduced power consumption by making use of both the PHY and MAC layers cooperative transmission.

The examples described herein use the aspects of cooperative communications to take advantage of the broadcast nature of wireless medium which may have limited the capabilities of prior systems because of the potential for interference between parallel links in prior systems. Whereas, herein, broadcast and spatial diversity can be utilized improve the performance of wireless links. Cooperative communications at PHY layer may be implemented by relaying protocols, such as AF, Decode-and-Forward (DF), CF, and QMF. In one example, QMF has been found to be particularly suitable by supporting the simultaneous transmission of multiple relays without requiring the relays to fully decode the received data thereby providing an efficient implementation. In marked contrast, MAC systems do not support QMF based relaying, since a typical prior MAC layer of a WLAN is designed to avoid simultaneous transmission from different nodes to prevent collisions. Therefore, the broadcast nature of signalling messages and the capability for simultaneous transmission at the PHY layer described herein are exploited in ways not contemplated by prior MAC systems.

According to the examples provided herein, the carrier sensing scheme of IEEE 802.11 standard MAC is redesigned to allow relays able to support good quality links to join a network with simultaneous transmissions. In addition, the carrier sensing and handshaking mechanism for the source and the destination nodes is modified to recruit relays 'in the air' without keeping a relay table at each node. The MAC header and framework also have been redesigned to support adaptive relay selection among direct transmission, single relay, and multiple relay modes.

Referring again to FIG. 2, in this example, the destination node sends back CTS 36 after the SIFS interval 10. Information that indicates the conditions of the relays can provide better performance than the direct transmission is carried in the CTS. This information is used at both the source and the destination to set the 'recruitment slot' for the following relay recruitment procedure. The maximum recruitment slot duration is arranged to equal the SIFS duration 10. The maximum recruitment slot duration corresponds to the relay back-off, which corresponds to the minimum conditions that a relay can provide better performance than direct transmission. The minimum recruitment slot is 0. The slot may equal 0 when the direct link achieves the maximal supported transmission rate of the system, and thus no relay joins the transmission.

The relays may start the back-off period 30 after receiving CTS 36, while both the source and the destination wait for a recruitment slot period to recruit relays. The back-off time at each relay may be set according to the overall achievable data rate of transmission from source to destination via the relay. A relay having a higher achievable data rate will have a shorter back-off time. The achievable data rate may be indicated by measures of signal quality of the link and by allowable modulation and/or coding schemes of the link. Signal quality may be indicated by the signal to noise ratio. The achievable data rate itself also may be used as an indication of signal quality.

If a relay completes a back-off period within the recruitment slot, the relay may send a RTR1 to respond to the recruitment opportunity. The RTR1 may include an indication of the achievable transmission rate for a link using the relay (e.g., an indication of signal quality) that is broadcast to the nearby nodes.

Based on the current information exchange, when multiple-relay is supported, the nodes may start another recruitment slot in the manner performed for the first recruitment slot. For example, a further relay may send out an RTR2 40. Once the relay recruitment period has completed, the source node transmits a data frame 42 after an SIFS interval 16. The recruited relays receive the data frame 42 from the source. After signal level processing according to the PHY layer cooperation scheme that is supported, for example, QMF, the recruited relays simultaneously re-transmit the data frames 44, 46 to the destination node after the SIFS interval 18. If the destination node is able to correctly receive the data by jointly processing the data received from the source and/or the relays, the destination node sends back an ACK 48 after the SIFS interval 20.

According to the scheme illustrated in FIG. 2, the destination node and the source node recruit relays in the air to avoid the overhead of keeping a relay table at each node. In addition, the cross layer design supports PHY cooperative schemes, such as QMF relaying schemes and randomized distributed space time coding schemes, which allow simultaneous transmission from relays at the PHY layer. For example, in the wireless system illustrated by FIG. 1, with one source node 2, one destination node 8, and two relays 4, 6, the wireless system is able to adaptively switch among three transmission modes wherein the source node sends data to the destination node: directly, via 1 relay, or via 2 relays (providing it is advantageous to do so). That is, in a first mode, the source node sends data directly to the destination node without any help from the relay direct, if the maximum supported rate is achievable. In a second mode, the source node sends data to the destination first, and the relay sends a copy to the destination afterwards, transmission via one of the relays improves performance. In the third mode, the relays send the data to destination afterwards simultaneously, if transmission via two relays achieves further gain in performance. As described herein, the destination node and the source node recruit relays in the air to avoid the need to keep a relay table at each node. In this example, QMF based PHY layer relaying protocol is used, since this protocol provides good performance as compared to AF and DF protocols. Of course, other examples may use alternative PHY layer relaying protocols, such as randomized distributed space time coding. In another example, the wireless system can support more than two relays simultaneously by providing further recruitment slots.

In another example, the transmission power for the nodes may be fixed, the RTS and CTS may be overheard by nodes other than the transmitter and intended receiver node, and the channel state information (CSI or received SNR) is available at the receiver side and is exchanged via RTS and CTS. Typically, the transmission in two directions between two nodes uses the same frequency and the channels are symmetric, for example, the channels have the same characteristics for transmissions in both directions.

Figure 5:
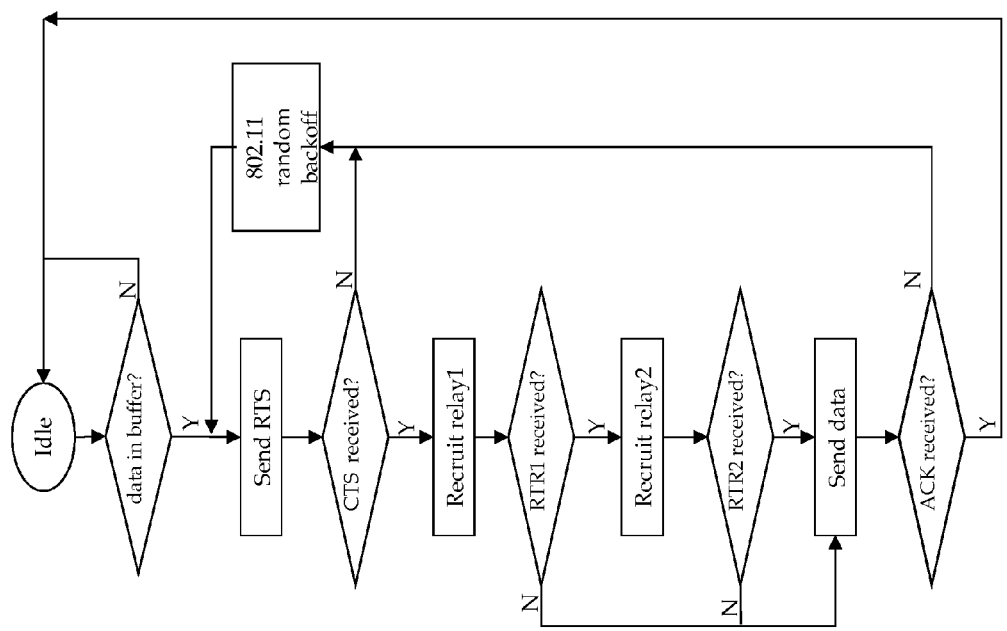
FIG. 5 is a flow diagram showing an example of processes at the source node according.

FIG. 5 is a flow diagram showing an example of processes at the source node. As shown in FIG. 5, the source node idles until there is at least one packet buffered in a queue. Once there is at least one packet buffered in the queue, sends out RTS to reserve the channel. If a CTS from the destination has not been received, the source node starts a random back-off after an interval of DIFS before sending out an RTS to reserve the channel. If a CTS from the destination has been received, the source may reserve the channel for transmission. In the CTS control frame, the destination node also informs the source node about the duration of a recruitment slot to recruit relays. The source may stay idle and listen to the channel for a period of the recruitment slot to recruit a relay until an RTR control frame is received or the recruitment slot expires. This recruitment may be repeated to recruit more relays depending on the system requirements. Once the recruitment procedure is completed, or the recruitment slot (or slots) expires, the source node starts to transmit the data frame. If an ACK is received, the source goes back to the idle status. If an ACK is not received, the source node goes back to the standard IEEE 802.11 DCF random back-off stage to find next opportunity to transmit data.

Figure 6:
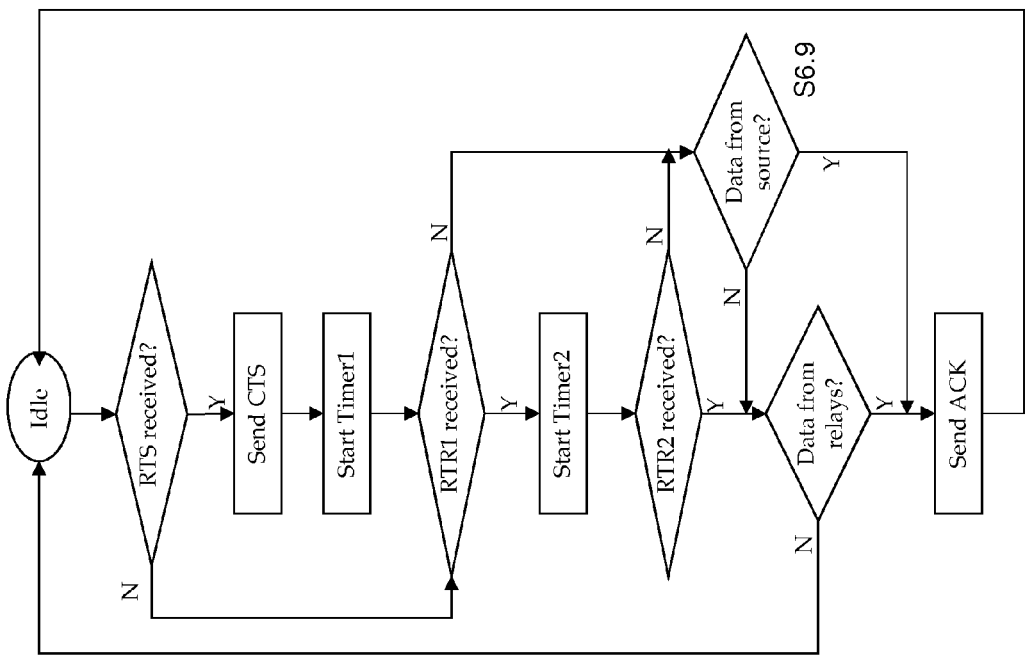
FIG. 6 is a flow diagram showing an example of processes at the destination node.

FIG. 6 is a flow diagram showing an example of processes at the destination node. As shown in FIG. 6, upon receiving the RTS from the source node, the destination node estimates the channel condition between the source and the destination. Based on the channel conditions, it further calculates the conditions at which the cooperative transmission via relays could help to improve the performance of direct transmission. To this end, if the destination node receives the RTS, the destination sends out the CTS control frame. The CTS control frame includes the settings of recruitment slot to recruit relays in the air. The destination node also starts a timer 1. If the RTS is not received or if the timer 1 is started, the destination node determines if a RTR1 is received. If the RTR1 is received, the destination node starts a timer 2 and determines if an RTR2 is received.

If neither the RTR1 nor RTR2 is received prior to the expirations of timers 1 or 2, respectively, the destination node determines whether data is received from the source node.

If the destination receives RTR 1 and/or RTR 2 control frames from the relays before the recruitment slot expires (as indicated by the timers 1 and 2), the relays join the transmission to provide better performance than the direct transmission, or the destination stays idle until the end of the recruitment slot. After receiving the data frame from the source node and/or relays and physical layer signal processing, detection and CRC (Cyclic Redundancy Check), the destination sends back ACK upon correct reception.

Figure 7:
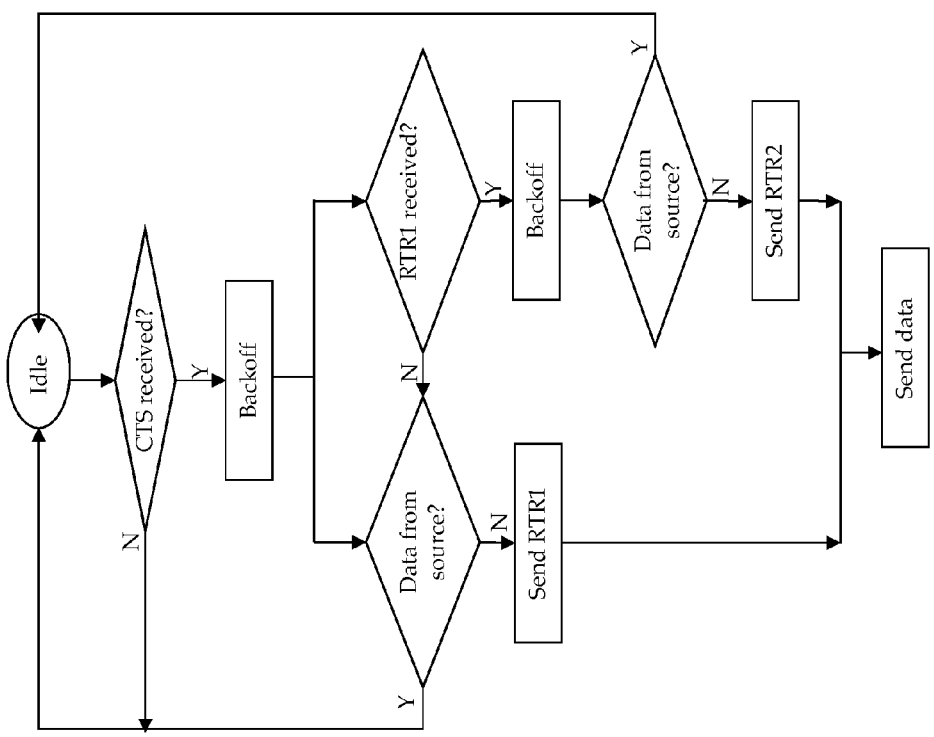
FIG. 7 is a flow diagram showing an example of processes at the relay node.

FIG. 7 is a flow diagram showing an example of processes at the relay node according. As shown in FIG. 7, after receiving the CTS, a potential relay node starts to back-off, that is to say starts a delay period. The back-off time may be set according to channel conditions from the relay to the source node and from the relay to the destination node. The relay node may estimate the channel quality based on the received RTS and CTS. The back-off time may be selected to ensure that relay nodes are able join the network when the overall achievable rate can be increased when the relay nodes join before the recruitment slot expires. If the back-off time at the relay node is shorter than the recruitment slot, the relay may send an RTR (e.g., RTR1 or RTR2 according to whether the relay is the first or second relay node to be recruited) to indicate that the relay will participate in the transmission. The relay receives the data frame from the source node, and sends data to the destination after some processing according to the PHY relaying schemes used.

A carrier sensing and handshaking scheme has been described above with reference to FIG. 2. A carrier sensing and handshaking scheme is now described in another example in more detail as follows. When a channel is not reserved by other nodes and there is data in the buffer at the source node, the source node may wait for a period equal to the DIFS and perform a random hack-off, as in the legacy IEEE 802.11 standard DCF scheme. Then the source node may reserve the channel by sending the control frame RTS. After waiting for an SIFS period, the destination node may broadcast the CTS control frame. The CTS control frame may include and deliver information about the setting of recruitment slot. Upon receiving the CTS, both the source node and the destination node may start the recruitment slot to recruit relays. At the same time, relays may start to back-off individually according to channel conditions, channel quality, achievable data rate, and/or channel state information relating to one or more links from the source node to the relay and from the relay node to the destination node. The back-off time may be arranged so that the better the channel quality is, the shorter the back-off time is. If a relay node finishes the back-off before the end of the recruitment slot, the relay node may send out a control frame RTR. The recruitment process may be repeated to recruit more relays in the same manner. In the exemplary case with two relays, the control frame handshaking procedure is completed after the second recruitment. The source node transmits the data frame after an SIFS, and the relays resend the received data from the source after another SIFS. The destination acknowledges the successful reception with an ACK to complete the transmission. Hidden nodes, for example nodes other than the source node, the destination node, and the relay nodes, may update the NAV (network allocation vectors) each time the nodes receive control frames from the wireless network. Control frames may reserve the channel for a duration as shown in the following table.

| Frame | NAV Reservation Duration |
| --- | --- |
| RTS | $T_{CTS}$ + 2 * SIFS + RS1 + RS2 |
| CTS | RS1 + RS2 + 2 * $T_{RTR}$ + $T_{DADAs}$ + SIFS |
| RTR1 | RS2 + $T_{DATAs}$ + $T_{DATAr}$ + SIFS |
| RTR2 | $T_{DATAs}$ + $T_{DATAr}$ + 3 * SIFS + ACK |
| DATA$_s$ | $T_{DATAr}$ + 2 * SIFS + ACK |
| DATA$_R$ | SIFS + ACK |
| ACK | 0 |

In the above table, RS denotes 'Recruitment slot', $T_{CTS}$, $T_{RTR}$ denote the transmission duration of the control frame CTS and RTR, $T_{DATAs}$ and $T_{DATAr}$ are the transmission duration of the data frame from the source node and the relay nodes, respectively. The Recruitment slot may establish the minimum conditions under which the relays are considered to provide better performance.

In one example, the duration of the recruitment slot may be set in the following way. For a WLAN, the maximum transmission supported at PHY layer with cooperation is $R_{max}$ Based on the channel quality of the source-destination link, the achievable rate of this direct link is $R(\gamma_{sd})$, where $\gamma_{sd}$ is the received SNR of the source-destination link. So duration of the recruitment slot is set to be:

$$\text{Recruitment slot } 1 = \left(1 - \frac{R(\gamma_{sd})}{R_{max}}\right) * SIFS.$$

In this example, the worse the source-destination channel quality is, the longer the recruitment slot is, and the maximum duration of the recruitment slot equals SIFS. In this case, the maximum back-off limit is the duration of SIFS, and the minimum may be 0 when the direct link is good enough. Setting the duration of the recruitment slot in this manner ensures minimization of the delay of the transmission and helps other relays to set the NAV. By listening to the CTS frame, each potential relay determines the channel conditions between the relay to the source node and the relay to the destination node. The relay can then calculate the achievable rate if the relay joins the transmission. If the achievable rate is smaller than $R(\gamma_{sd})$, the relay remains idle, for example, by setting the back-off to 3*SIFS, which is typically longer than the recruitment slot. If the achievable rate is greater than $R(\gamma_{sd})$, the relay starts back-off with a period of the following:

$$\text{backoff duration } 1 = \left(1 - \frac{R(\gamma_{sr}, \gamma_{rd}, \gamma_{sd})}{R_{max}}\right) * SIFS.$$

By this process, the higher the achievable rate the relaying transmission can achieve, the shorter the back-off time is. So that:

$$R(\gamma_{sd}) < R(\gamma_{sr}, \gamma_{rd}, \gamma_{sd}), \text{Recruitment slot1>backoff time1}.$$

So the back-off time is set as below:

$$\text{backoff duration } 1 = \begin{cases} \left(1 - \frac{R(\gamma_{sr}, \gamma_{rd}, \gamma_{sd})}{R_{max}}\right) * SIFS & \text{if } R(\gamma_{sd}) < R(\gamma_{sr}, \gamma_{rd}, \gamma_{sd}) \\ 3 * SIFS & \text{if } R(\gamma_{sd}) \geq R(\gamma_{sr}, \gamma_{rd}, \gamma_{sd}) \end{cases}$$

In the case of multiple relays, each relay may reset their back-off duration whenever the relay hears an RTR from another relay. The reset back-off period starts once transmission from another relay has ceased. In the RTR1 control frame, the relay also broadcasts information about $R(\gamma_{sr}, \gamma_{rd}, \gamma_{sd})$ (to simplify $R_2$ to is used to denote this below). In the case of multiple relays, based on this information, the $2^{nd}$ recruitment starts with duration:

$$\text{Recruitment slot } 2 = \left(1 - \frac{R_1}{R_{max}}\right) * SIFS.$$

And each relay resets their duration time with:

$$\text{backoff duration } 2 = \begin{cases} \left(1 - \frac{R_2}{R_{max}}\right) + SIFS & \text{if } R_2 < R_1 \\ 2 * SIFS & \text{if } R_2 \geq R_1 \end{cases}$$

where $R^2$ is the achievable rate of the relay participating the transmission as a $2^{nd}$ relay.

Figure 8:
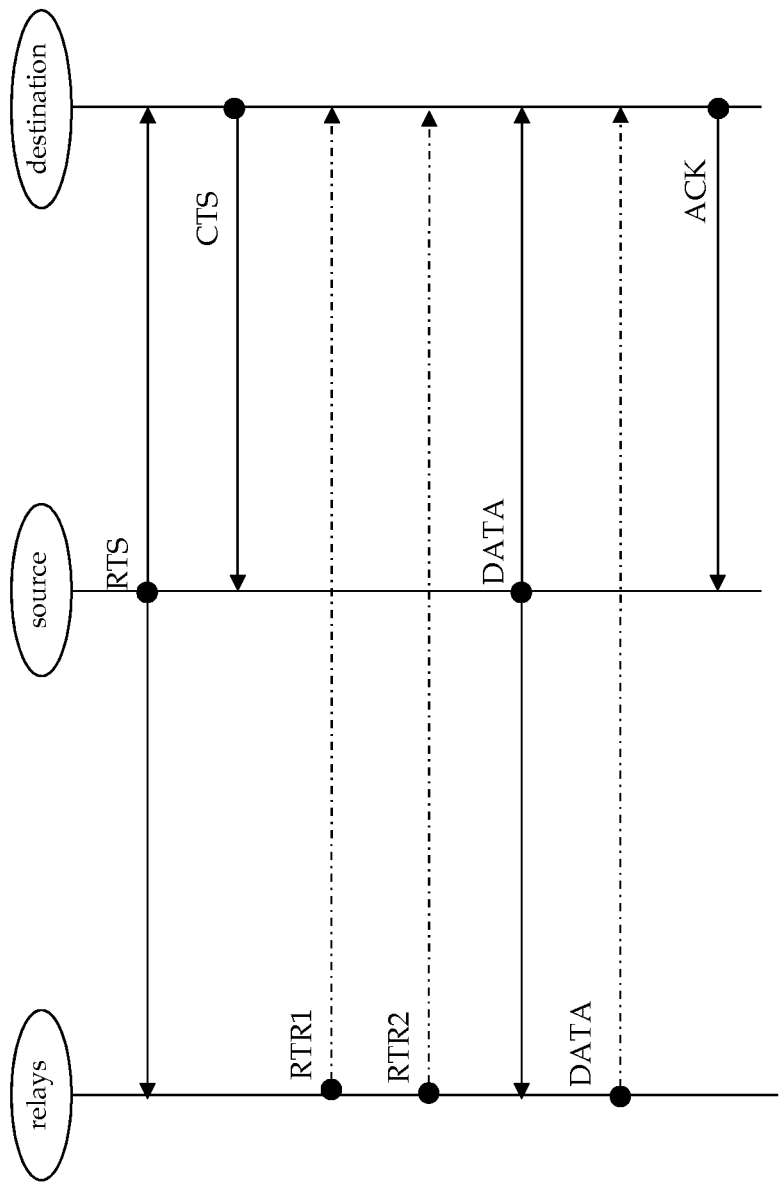
FIG. 8 is a diagram showing an example of messaging.

FIG. 8 shows an example of a messaging diagram for the communication of control messages, data messages, and acknowledgement messages between a source node, relays nodes, and destination node.

In this example, when the source-destination link is able to achieve the maximum supported rate, the actual recruitment slot is set to 0. When the actual recruitment slot is set to 0, the source node sends the data frame after one SIFS slot. No extra time is wasted waiting for responses from relays. As a result, this protocol is different from other protocols which require the system to allocate a fixed time to wait for the response from the relays.

According to the descriptions provided herein, the RTS may be the same as with the legacy IEEE 802.11 standard. The CTS may have a format as illustrated in FIG. 9. As shown in the example of FIG. 9, eight extra bits have are used in the duration field of the 802.11 standard CTS frame, and the duration field is modified to include both the duration and the recruitment slot information used to inform the source to recruit relays. The RTR may have a format as illustrated in FIG. 9. As shown in FIG. 9, an extra 16 bits of the RTR are used in the duration field to set the transmission rate for both source-relay and relay-destination links.

Figure 10:
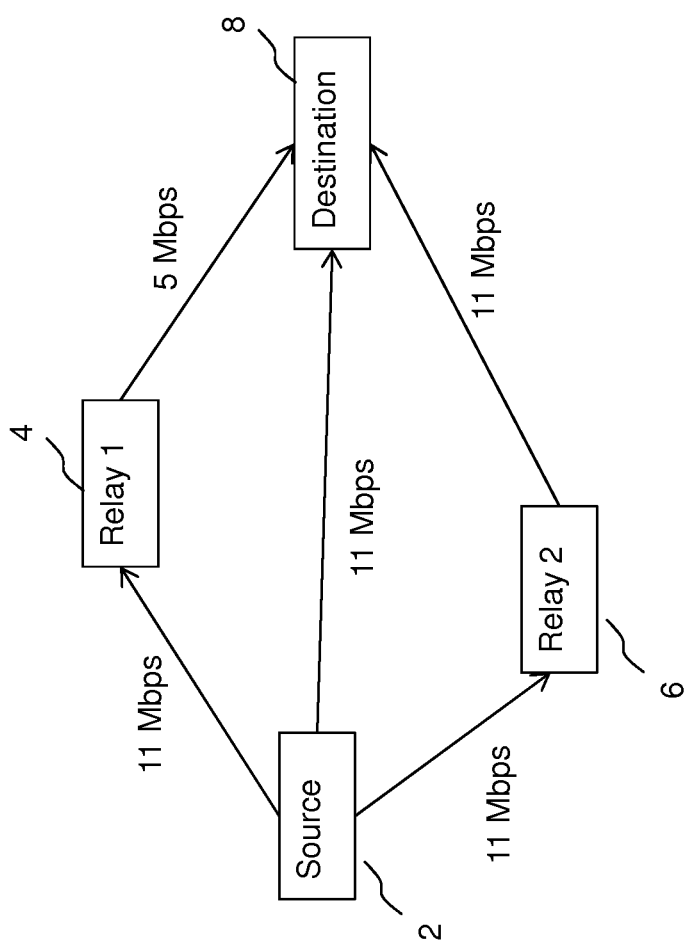
FIG. 10 is a schematic diagram illustrating an example of selection of transmission mode when source-destination link is an advantageous choice.

FIG. 10 is a schematic diagram illustrating an example of the selection of transmission mode when the choice of the source-destination link is advantageous. In the example shown in FIG. 10, the highest transmission rate of the system, limited by the coding and modulation rate, is 11 Mbps. The direct transmission supports the highest rate, and the cooperative transmission is not needed. In this example, the recruitment slot duration is set to 0, and the source transmits without recruiting any relays.

Figure 11:
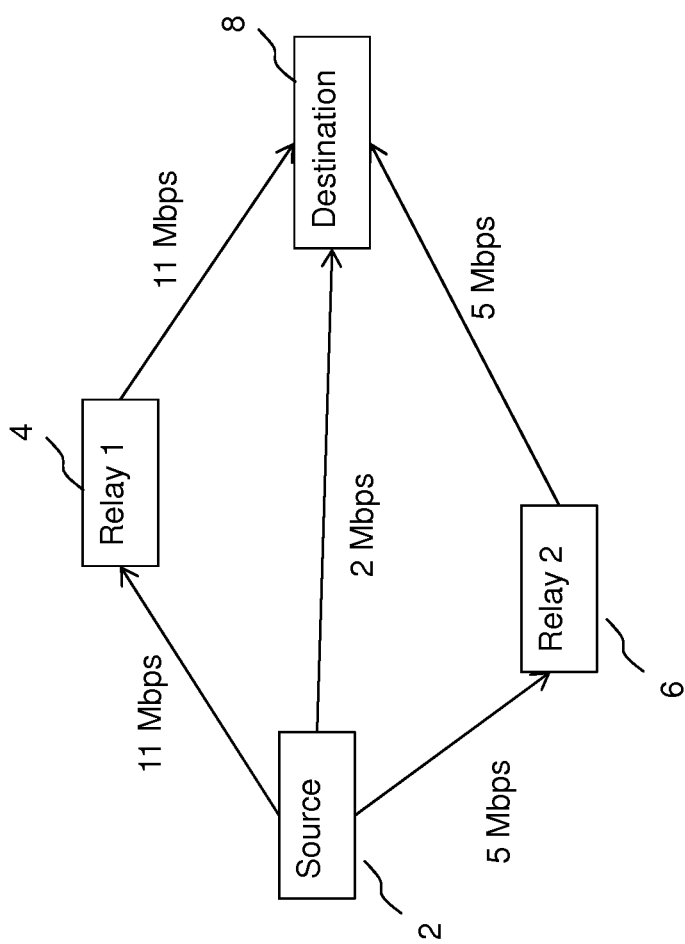
FIG. 11 is a schematic diagram illustrating an example of selection of transmission mode when cooperative transmission via 1 relay is an advantageous choice.

FIG. 11 is a schematic diagram illustrating an example of the selection of transmission mode when the choice of the cooperative transmission via 1 relay is advantageous. In the example shown in FIG. 11, since the source-destination only supports 2 Mbps, the recruitment slot is set to a period appropriate to that rate. The Relay 1 provides an overall rate higher than 2 Mbps, and Relay 1 sends an RTR to respond to the recruitment. Relay 2 also provides a rate that is better than the direct link but worse than Relay 1, so Relay 2 backs-off for a longer time than Relay 1 so that the relay that provides the higher rate link may join the transmission first. If multiple-relay mode is allowed, then Relay 2 responds in the second recruitment slot, and both relays transmit the data frame to the destination node simultaneously.

Figure 12:
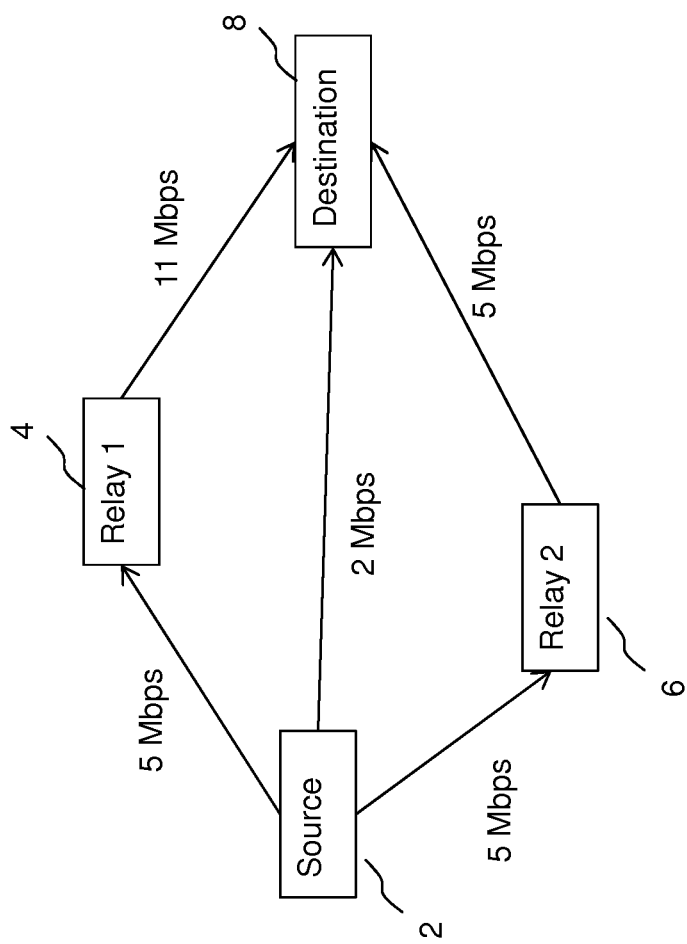
FIG. 12 is a schematic diagram illustrating an example of selection of transmission mode when cooperative transmission via 2 relays is an advantageous choice.

FIG. 12 is a schematic diagram illustrating an example of a selection of transmission mode when the choice of cooperative transmission via two relays is an advantageous. In the example shown in FIG. 12, Relay 1 joins the transmission first as Relay 1 offers the highest rate link, and Relay 2 joins the transmission in the second recruitment slot since a higher transmission rate can be achieved with two relays.

In an example, alternative relaying protocols at the PHY layer may be used, such as Decode and Forward (DF). In this case, the destination informs the source/relays the CTS control frame about the specific modulation/coding combinations instead of the transmission rate requirements. By receiving this information, relays can judge themselves if they are able to transmit in this kind of coding/modulation format to ensure reliable transmission. Qualified nodes can transmit in the modulation/code, enabling straightforward signal detection.

Figure 13:
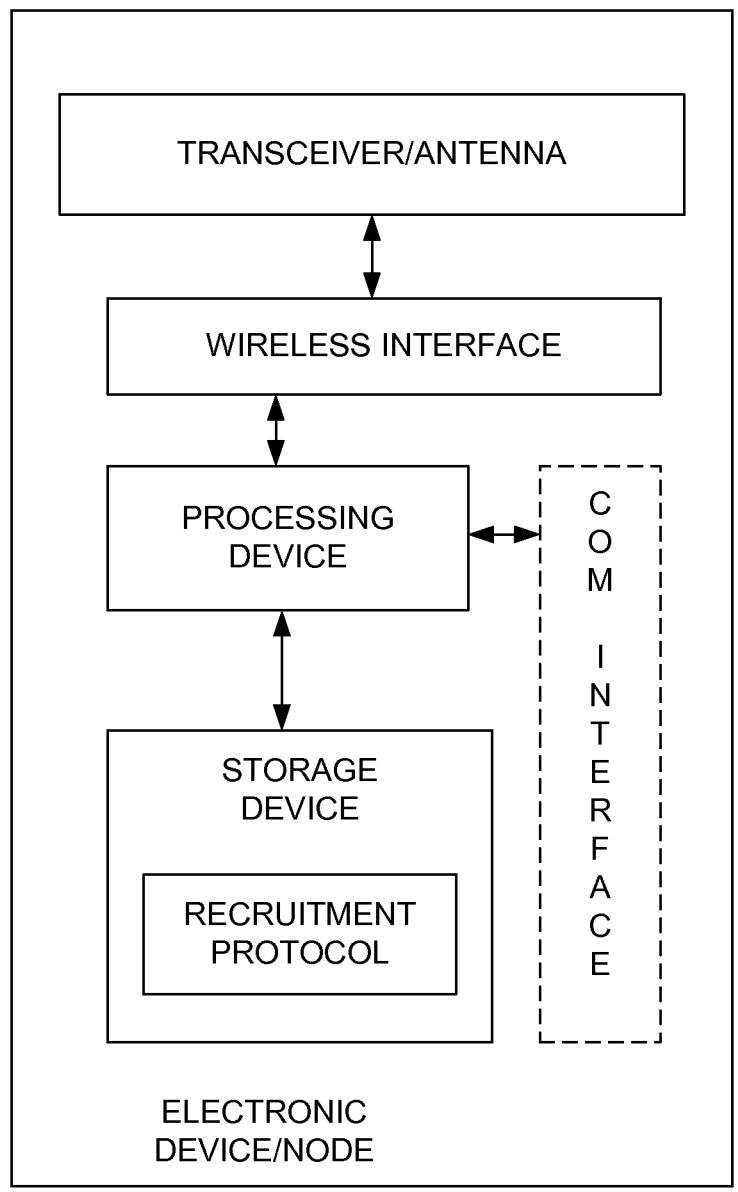
FIG. 13 is a block diagram illustrating an electronic device.

FIG. 13 shows one example of a network node (e.g., a source node, a destination node, and/or a relay node) according to the descriptions herein. A network node may be an active electronic device that is connected to the network that is capable of sending, receiving, or forwarding information over a communications channel. As shown, the electronic device may include an antenna, a transmitter, a receiver (e.g., a transceiver), a wireless interface configured to receive and transmit messages on a wireless communications channel using the recruitment and message protocols described herein. The electronic device also may include a processing device and a memory. The memory may store software including software configured to implement the methods described herein, including the recruitment and message protocols. In one example, the electronic device is configured to transmit and receive data packets over a shared wireless medium of a WLAN according to IEEE 802.11 standard protocols. The electronic device also may include an additional and/or optional communications interface for communication via other communication mediums. Of course the device shown in FIG. 13 is exemplary, and electronic devices may include additional elements and configurations including multiple, memories, processors, and other interfaces (not shown).

The processing device may be implemented using one or more general-purpose or special purpose computers, such as, for example, a processor, a controller, an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS, such as a wireless communication protocol including methods described herein, such as the recruitment and message protocols. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors or quad processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and the data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

The above description and drawings are to be understood as illustrative examples. It is also to be understood that any feature described in relation to any one example may be used alone, or in combination with other features described, and may also be used in combination with one or more features of any other of the example, or any combination of any other of the examples. Furthermore, equivalents and modifications not described above also may be employed without departing from the scope of the invention as set forth by the accompanying claims.

The invention claimed is:

1. A method of transmitting signals in a wireless network, the wireless network comprising a source node, a destination node, and at least a first relay node, the method comprising:
obtaining a first measure of signal quality of a direct link between the source node and the destination node;
obtaining a second measure of signal quality of a link between the source node and the destination node via at least the first relay node; and
determining, based on the first measure of signal quality, a duration of a recruitment slot within which the relay node may transmit a recruitment message indicating availability of the relay node to relay.

2. The method according to claim 1, further comprising:
   determining a delay period for transmission of the recruitment message from the first relay node based on the second measure of signal quality; and
   transmitting the recruitment message after the determined delay.

3. The method according to claim 1, further comprising:
   selecting from among at least transmitting data from the source node to the destination node in a first mode comprising transmission directly from the source node to the destination node and a second mode comprising transmission from the source node to the destination mode by a first path via one relay.

4. The method according to claim 3, further comprising:
   selecting to transmit data according to the second mode of operation on a basis comprising the first and second measures of signal quality.

5. The method according claim 1, further comprising:
   sending a first message from the source node indicating that data is ready to send;
   receiving the first message at the destination node; and
   determining the first measure of signal quality from the signal quality of the first message as received at the destination node.

6. The method according to claim 5, further comprising:
   receiving the first message at the first relay node; and
   determining the second measure of signal quality from at least the signal quality of the first message as received at the first relay node.

7. The method according to claim 6, further comprising:
   determining a duration of a recruitment slot within which a relay node may transmit a message on the basis of the signal quality of the received first message;
   sending a second message from the destination mode comprising an indication of the duration of the recruitment slot within which a relay node may transmit a message.

8. The method according to claim 7, further comprising:
   receiving the second message at the first relay node,
   wherein determining the second measure of signal quality includes determining the second measure of signal quality on the basis of at least the signal quality of the second message as received at the first relay node.

9. The method according to claim 8, further comprising:
   determining a delay period starting from the end of receipt of the second message at the first relay node;
   transmitting a third message comprising a recruitment message from the first relay node after the determined delay period when the determined delay period is less than or equal to the duration of the recruitment slot.

10. The method according to claim 9, wherein transmitting a third message includes transmitting the third message including an indication of the second measure of signal quality.

11. The method according to claim 10, further comprising:
    transmitting from the source node to the destination node by a first path via one relay based on receipt of the third message.

12. The method according to claim 10, further comprising:
    determining a data rate for transmission of data from the source node on a basis comprising the indication of the second measure of signal quality in the third message.

13. The method according to any of claim 10, further comprising:
    determining a modulation scheme for transmission of data from the source node on a basis of the indication of the second measure of signal quality in the third message.

14. The method according to claim 3, wherein selecting from among at least a first mode and a second mode further includes selecting among the first mode, the second mode, and a third mode comprising transmission from the source node to the destination mode via a combination of the first path via the first relay node and a second path via a further relay node, and the method further comprising:
    receiving, at the further relay node, a first message from the source node indicating that data is ready to send;
    determining a third measure of signal quality of the first message as received at the further relay node;
    receiving, at the further relay node, a second message from the destination mode comprising an indication of the duration of the recruitment slot within which a relay node may transmit a message;
    receiving a third message including a recruitment message from the first relay node;
    determining a fourth measure of signal quality as a measure of signal quality of the second message as received at the further relay node;
    determining a delay period for transmission of a fourth message based on the third and fourth measures of signal quality starting from the end of receipt of the third message at the further relay node; and
    transmitting the fourth message after the determined delay period when the determined delay period is less than or equal to the duration of the recruitment slot.

15. The method according to claim 14, wherein transmitting the fourth message includes transmitting the fourth message including an indication of received signal quality based on the third and fourth measures of signal quality.

16. The method according to claim 15, further comprising:
    selecting the third mode of operation for transmission of data from the source node on a basis of the receipt of the third and fourth messages; and
    determining a data rate for transmission of data from the source node on a basis of the indication in the third message and the fourth message of received signal quality based on the first measure, the second measure, the third measure, and the fourth measure of signal quality.

17. The method according to claim 14, further comprising transmitting data simultaneously via the first and second paths.

18. The method according to claim 17 further comprising relaying data at the first relay node and the further relay node according to a Quantise Map and Forward protocol.

19. The method according to claim 5, wherein sending the first message includes sending a Ready To Send message.

20. The method according to claim 7, wherein sending the second message includes sending a Clear To Send message.

21. The method according to claim 9, wherein transmitting the third message includes transmitting a Ready To Relay message.

22. The method according to claim 14, wherein transmitting the fourth message includes transmitting a Ready To Relay message.

23. The method according to claim 1, wherein determining a duration of a recruitment slot based on the first measure of signal quality within which the relay node may transmit a recruitment message indicating availability of the relay node to relay further includes determining the duration on the basis of an allowed modulation or coding scheme.

24. The method according to claim 22, further comprising receiving an indication of said allowed modulation or coding scheme from the source node.

25. A relay node for transmitting signals in a wireless network, the wireless network comprising a source node, a destination node and at least the relay node, the wireless network being arranged to determine a first measure of signal quality relating to a direct link between the source node and the destination node, and a second measure of signal quality relating to a link between the source node and the destination node via at least the first relay node, the relay node configured to determine, based on the first measure of signal quality, a duration of a recruitment slot within which the relay node may transmit a recruitment message indicating availability of the relay node to relay.

26. The relay node according to claim 25, the relay node further configured to transmit a recruitment message and determine a delay period for transmission of the recruitment message from the first relay node based on the second measure of signal quality.

* * * * *